(12) United States Patent
Tandler et al.

(10) Patent No.: US 6,276,804 B1
(45) Date of Patent: Aug. 21, 2001

(54) MICROSCOPE WITH AT LEAST ONE BEAM SPLITTER

(75) Inventors: Hans Tandler; Stefan Schmidt, both of Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/563,050

(22) Filed: May 1, 2000

(30) Foreign Application Priority Data

May 28, 1999 (DE) .............................................. 199 26 037

(51) Int. Cl.⁷ ............................ G02B 27/00; G02B 21/06
(52) U.S. Cl. ........................ 359/614; 359/368; 359/385; 359/601
(58) Field of Search ...................................... 359/368–390, 359/601–614, 709, 821; 356/317–318, 417; 250/458.1, 459.1, 461.1, 461.2

(56) References Cited

U.S. PATENT DOCUMENTS

| 4,185,902 | * | 1/1980 | Plaot ..................................... 359/614 |
| 5,220,453 | * | 6/1993 | McKinley et al. .................... 359/613 |
| 5,335,114 | * | 8/1994 | Suzuki ................................... 359/614 |
| 5,371,624 | * | 12/1994 | Nagano et al. ....................... 359/389 |
| 5,745,293 | * | 4/1998 | Lassalle .............................. 359/614 |

* cited by examiner

Primary Examiner—Thong Nguyen
(74) Attorney, Agent, or Firm—Reed Smith LLP

(57) ABSTRACT

A microscope with at least one beam splitter, particularly for the examination of fluorescing specimens, wherein unwanted illumination light is deflected onto a reflecting surface having an at least partially conical shape for the purpose of suppressing reflections, and a rotatable turret is advantageously provided for swiveling in different beam splitter cubes, and the surface is located in the middle of the turret.

3 Claims, 3 Drawing Sheets

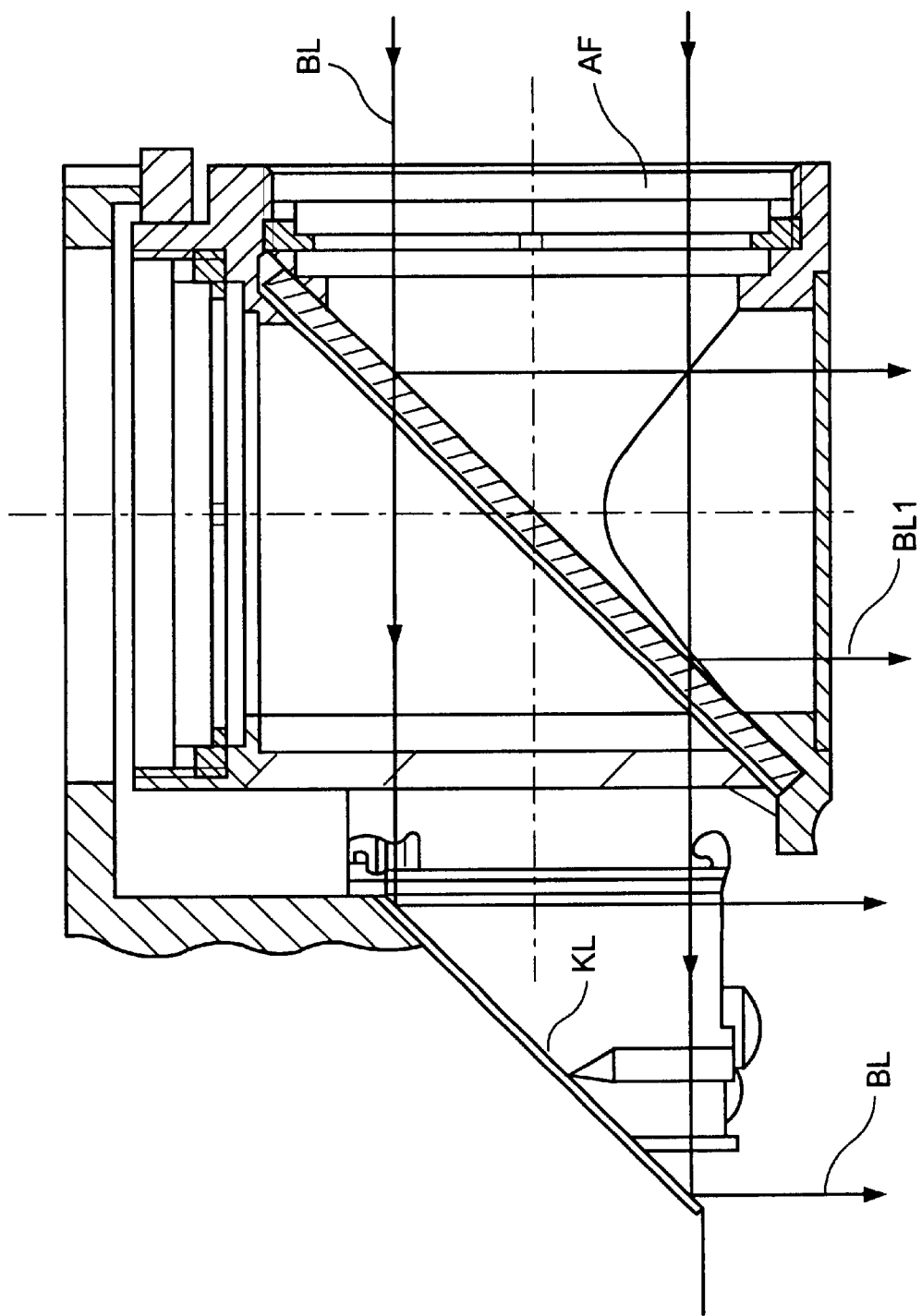
F I G. 2

MICROSCOPE WITH AT LEAST ONE BEAM SPLITTER

BACKGROUND OF THE INVENTION a) Field of the Invention

The invention relates to a microscope with at least one beam splitter, particularly for examining fluorescing specimens.

b) Description of the Related Art

Reflector modules for fluorescence microscopy comprise two filters and a selectively acting splitter mirror.

The light exciting fluorescence in the specimen is made available through an excitation filter in a narrow band corresponding to the selected application method and in the required wavelength. The splitter mirror directs this light as efficiently as possible through an objective onto the specimen. The wavelength emitted at the latter, passes the splitter mirror again with an offset relative to the excitation light in the long-wave spectrum. This second passage through the splitter mirror must also be effected efficiently with respect to wavelength. A blocking filter arranged following the splitter mirror allows almost one hundred percent of the emitted light to pass, but possible components of the excitation light are held back just as completely.

FIG. 1 is a sectional view showing the illumination beam path BL traveling through the excitation filter AF for fluorescence excitation in a microscope, not shown, which is deflected at a beam splitter ST in the direction BL1 of an object via an objective, not shown.

The light OL coming back from the object travels via a blocking filter SF upward in the direction of an evaluating beam path with tube lens, not shown, and, for example, a TV camera.

A beam path RL, shown in dashed lines, shows an unwanted component of the illumination light BL which goes through the beam splitter ST and strikes the blackened rear wall R which is supposed to absorb this unwanted portion of the excitation light as completely as possible.

However, at this rear wall, a proportion RL1 is reflected and scattered at unavoidable miniature structures on the surface and travels at an angle back to the glass surface of the beam splitter ST and from the latter in the direction of observation/detection at an angle to the optical axis as unwanted reflected light RL2.

The angle-dependent blocking filter can also not completely filter out this component because of the angle to the optical axis.

As can be seen in FIG. 1, reflector modules constructed in the manner known heretofore bring about a partially indirect reflection or scattering of the excitation light which passes the splitter without reflection and travels back to the splitter and then into the emission channel. Since the beam angles are changed by this indirect reflection in such a way that they break the direction-dependent selectivity of the splitter and emission filter, the optical prerequisite for the background lighting is given. In the emission channel, like autofluorescence of glasses and coatings, it provides for lighting of the image background which reduces the intensity distance from the useful signal and accordingly makes detection of weak fluorescence signals difficult or impossible.

OBJECT AND SUMMARY OF THE INVENTION

The primary object of the invention is to improve the detection of fluorescence signals using reflector modules in fluorescence microscopy.

In accordance with the invention, a microscope having at least one beam splitter, particularly for examining of fluorescing specimens, provides that unwanted illumination light is deflected onto a reflecting surface having an at least partially conical shape for the purpose of suppressing reflections.

BRIEF DESCRIPTION OF THE DRAWINGS

In the drawings:

FIG. 2 is a reflect module in sectional view in accordance with the invention.

DESCRIPTION OF THE PREFERRED EMBODIMENTS

In FIG. 2, the rear wall R is advantageously removed and is accordingly permeable to light; and the continuous illumination light strikes a cone envelope KL, shown in section, which ensures that the light is reflected downward completely out of the beam path. The bearing of the reflection module shown in FIG. 2 is optimally suited for this purpose and is situated in the principal section at 45° to the incident light and, through the circles of different diameter in the sagittal sections, corresponds to the demand for a light trap.

Figure 1:
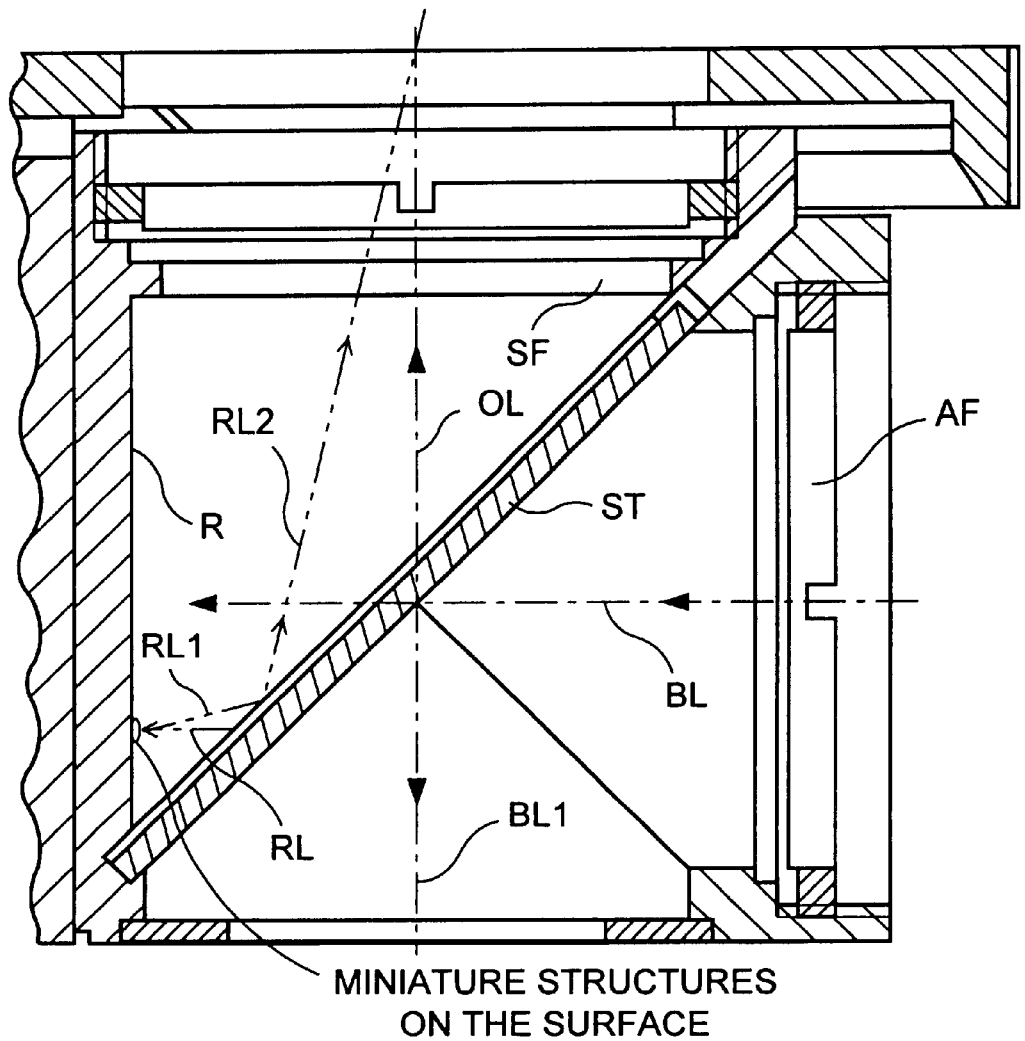
FIG. 1 is a sectional view of a reflector module for fluorescence microscopy.
Figure 3:
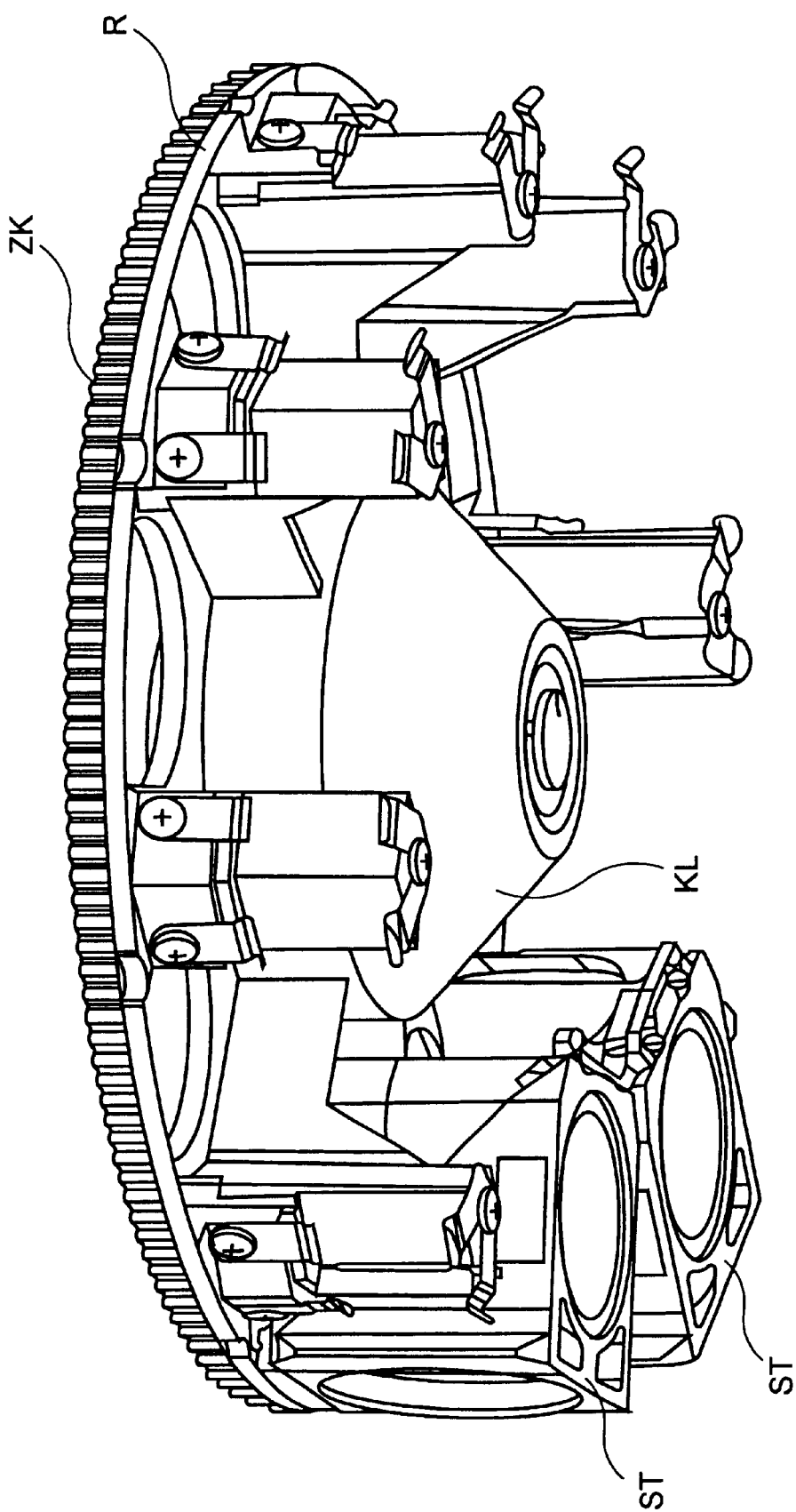
FIG. 3 is a perspective view of a turret arrangement which allows utilization of up to eight different beam splitters to be changed in the beam path.

FIG. 3 shows a turret R which is rotatable via a toothed rim ZK and which advantageously enables up to eight different beam splitters to be changed in the beam path. Two beam splitters ST are shown. Arranged in the center is the conical envelope KL, on which the reflections arrive and are deflected via the open rear wall of the respective beam splitter that is swiveled in. Slight deviations from the conical envelope shape in the direction of a slightly spherically curved surface are also conceivable without departing from the inventive ideas concerning the diverting of interfering reflections. The reflecting surface may have a smooth polished coating.

While the foregoing description and drawings represent the preferred embodiments of the present invention, it will be obvious to those skilled in the art that various changes and modifications may be made therein without departing from the true spirit and scope of the present invention.

What is claimed is:

1. A microscope with at least one beam splitter capable of examining fluorescing specimens comprising:

an arrangement wherein unwanted illumination light is deflected onto a reflecting surface having an at least partially conical shape for the purpose of suppressing reflection; and wherein a rotatable turret is provided for swiveling in different beam splitter cubes and said surface is located in a middle section of the turret.

2. The microscope according to claim 1, wherein said surface has a smooth polished coating.

3. The microscope according to claim 1, wherein for the purpose of suppressing reflections unwanted illumination light is deflected out of an observation/imaging beam path via a light-permeable opening at one side of a beam splitter cube.

\* \* \* \* \*